United States Patent

Swon et al.

[11] Patent Number: 6,155,113
[45] Date of Patent: *Dec. 5, 2000

[54] STIRRING SHAFT MONITORING COMPARATOR

[75] Inventors: James E. Swon, Brookside; Henry Hofer, East Hanover, both of N.J.

[73] Assignee: VanKel Technology Group, Cary, N.C.

[*] Notice: This patent is subject to a terminal disclaimer.

[21] Appl. No.: 08/051,377

[22] Filed: Apr. 23, 1993

[51] Int. Cl.[7] ........................................................ G01M 1/14
[52] U.S. Cl. .................................. 73/457; 73/462; 73/660; 366/142
[58] Field of Search ............................... 73/455, 457, 462, 73/649, 661, 660, 488; 210/321.63, 319; 366/142; 422/259

[56] References Cited

U.S. PATENT DOCUMENTS

| | | | |
|---|---|---|---|
| 4,016,752 | 4/1977 | Carey | 73/660 |
| 4,057,754 | 11/1977 | Pattantyus-Abrahan et al. | 324/207.25 |
| 4,165,631 | 8/1979 | Boinet et al. | 73/54.01 |
| 4,594,883 | 6/1986 | Pollard | 73/54.23 |
| 4,704,035 | 11/1987 | Kowalczyk | 366/142 |
| 4,740,309 | 4/1988 | Higuchi | 210/321.63 |
| 5,021,737 | 6/1991 | Schutts | 73/661 |
| 5,042,292 | 8/1991 | Plint et al. | 73/54.39 |
| 5,287,732 | 2/1994 | Sekiguchi | 73/54.33 |

FOREIGN PATENT DOCUMENTS 2120565  12/1983  United Kingdom .................. 366/142

OTHER PUBLICATIONS

Wazer et al., "Viscosity and Flow Measurement", pp. 37–39, 86–89, 96–97,100–113, 116–119, 124, 125, Interscience Publishers, NY, 1963.

Primary Examiner—Hezron Williams
Attorney, Agent, or Firm—Jenkins & Wilson, P.A.

[57] ABSTRACT

In a preferred embodiment, there is an electronic comparator that monitors and exhibits on one or more video displays current information measured and monitored as to physical attributes relating to a revolvably rotating linearly-extending stirring shaft of which a distal end carries stirring blades positioned within media supported within a vessel stably mounted relative to a stably mounted drive mechanism and the stirring shaft, and a visual display video that during stirring displays visually the measured and monitored current degree of wobble of the stirring shaft, magnitude of vibrations of the stirring shaft, current degree of verticality of the stirring shaft, current temperature of media being stirred by the stirring shaft, current rate of revolutions per unit of time of the stirring shaft, a printing mechanism that prints current measured and monitored physical attributes onto a substrate, a computer interface structure and mechanism thereof adapted to convey measured and monitored physical attributes to one or more computer units and/or video monitors and/or printers thereof, and mounting structure for establishing and maintaining stable mounting and ascertained relative predetermined and established positioning to one-another of the stirring shaft's rotary drive structure and mechanism thereof, the stirring shaft, the vessel and the monitoring and measuring mechanism and structure thereof, during agitation of media by the blades on the distal end of the stirring shaft.

13 Claims, 4 Drawing Sheets

FIG. 2
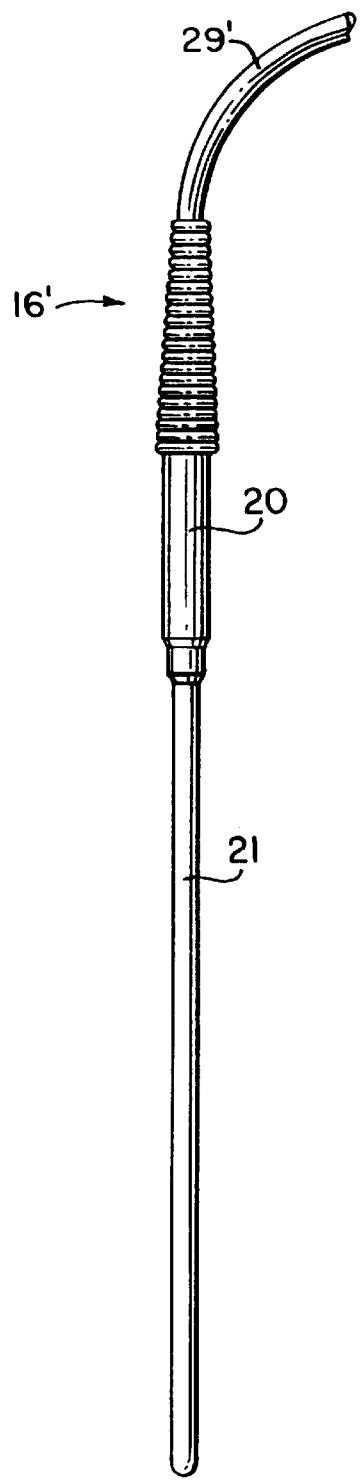
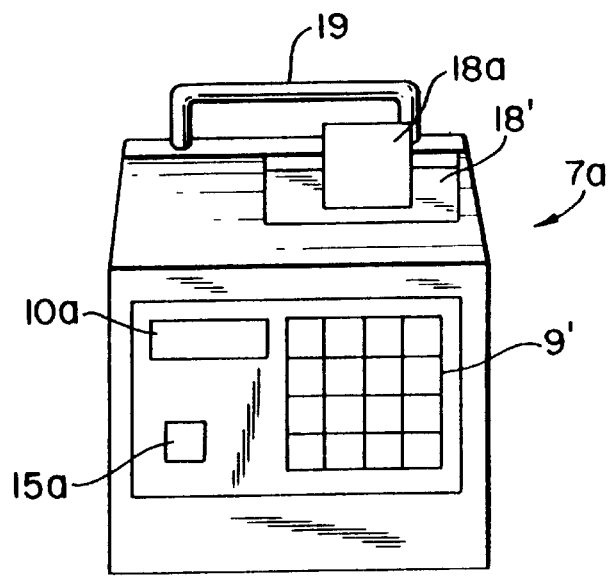
FIG. 5

STIRRING SHAFT MONITORING COMPARATOR

PRIOR ART

While a novelty determination was conducted in the United States Patent and Trademark Office patent search Class 73, subclasses 865.9, 866.1, a61/71 thereof, no specific comparator and/or sensors were found as relates to a laboratory testing device for ascertaining and monitoring for a linearly extending stirring shaft having distal end stirring blades for the monitoring of physical attributes while stirring a media with a vessel stably mounted relative to the revolving stirring shaft during the stirring of the media.

Accordingly, insofar as the inventor as an expert and leader in this field, has been able to ascertain, there does not exist any relevant prior art.

BACKGROUND

In the fields to which the present invention relates, namely that of testing permeability of a membrane to flow therethrough of a composition or drug, or that of testing rate of flow (permeation) of a composition or drug through a membrane of known permeability, there are federal regulations setting minimum standards directed to making all tests under unchanging identical conditions with regard to the degree and extent of maintaining a homogeneous distribution in the vessel carrying a constant amount of media, normally water, while a totally straight stirring shaft carrying the stirring blades is devoid of distorting nonlinear shape, vibrations causing erratic stirring, inconsistent or varying rate of revolutions, constant temperature of the media being stirred, and a totally perpendicular stirring shaft of the stirring blades as to avoid dissimilar or unascertainable degree of mixing. A bent stirring shaft manifests itself in what in the trade is termed "wobble", causing the rotating shaft and blades thereof to produce uneven stirring and vibrations that also could distort normal rate of membrane permeation. Vibrations from any other source for the same reason must be ascertain, to assure that any vibrations are held below significantly deleterious levels. Lack of or variations from normal as to current verticality of the stirring shaft is indicative of nonaligned or nonleveling of the mounting structure from which the stirring shaft extends, and/or of the vessel in its mounting, and/or of the mounting structure for the monitoring comparator. Federal regulations setting the required standards are found in USP XXII in the description of Apparatus 1 and Apparatus 2. Any such variation, serve to make monitored and ascertained indicia of physical attributes dissimilar from otherwise prior standards during testing, and thus making the latest distorted indicia useless and/or results of the permeability or membrane test totally unreliable and/or not meaningful. Additionally, heretofore there has been an absence of quick ways of making these several determinations available for easy comparison to prior readings; such is important in order to quickly or early ascertain any detrimental or undesirable trends in the displayed and/or printed information. Also, heretofore, in the absence of careful monitoring and recording and comparing systematically, no reliable method of comparing trends of differences appearing in results for membrane permeability and/or rate of drug permeability of membranes of known permeability.

OBJECTS OF THE INVENTION

Accordingly, objects of the invention includes the overcoming and/or avoiding of one or more of problems and difficulties above-noted.

Another object is to obtain novel records of intermittent recordings of physical data attributes above discussed, to enable early detection of problems and/or trends toward impending problems regarding worsening one or more readings.

Another object is to obtain a comprehensive overall picture of existing physical attributes relating to the stirrer, and the tests being conducted above-noted, as to confirm asbsence of problems, enabling detection of problems to be concentrated into other area when problem solving re inconsistent unexplainable results.

Another object is to enable easy verification of continued compliance with federal standards for the stirring equipment and operation thereof.

Another object is to make available easy and multiple monitoring and printings at different distant location, devoid of delay or time loss.

Another object is to obtain distribution of monitored results to diverse locations automatically, enabling integration of recent results with other data.

Other objects become apparent from the preceding and following disclosure.

BROAD DESCRIPTION OF THE INVENTION

Broadly the invention may be described a laboratory stirring shaft and solution monitoring comparator having at-least two main elements in combination, namely a monitoring structure(s) and mechanism, and a visual display structure(s) and mechanism thereof.

The monitoring structures(s) and mechanism thereof are adapted for use in association with a downwardly-directed revolvable linearly-extending stirring shaft having a distal end at least one of carrying and adapted to carry at least one stirring blade. The monitoring structure(s) and mechanism thereof being for measuring physical attributes of the linearly-extending stirring shaft when the linearly-extending stirring shaft has the distal end stably mounted and positioned to be within media to be agitated and positioned for the at least one stirring blade to agitate the media when media within a vessel stably positioned relative to the linearly-extending stirring shaft.

The visual display structure(s) and mechanism thereof visually displays data measured by the monitoring structure (s) and mechanism thereof of the physical attributes.

In a first preferred embodiment, as an improvement on the broad invention above-described, the monitoring structure (s) and mechanism thereof includes a stirring shaft wobble-ascertaining structure(s) and mechanism thereof for determining current degree of wobble of the linearly-extending stirring shaft during agitation of media positioned within a vessel stably positioned relative to the linearly-extending stirring shaft. relative to the linearly-extending stirring shaft.

In a second preferred embodiment, as an improvement on the first preferred embodiment, the monitoring structure(s) and mechanism thereof include a stirring shaft vibration-ascertaining structure(s) and mechanism thereof for determining current magnitude of vibrations of the linearly-extending stirring shaft. Such measurement may be taken before, during or after agitation, but must be correct during agitation of media positioned within a vessel stably positioned relative to the linearly-extending stirring shaft.

In a third preferred embodiment as an improvement on the second preferred embodiment, the monitoring structure(s) and mechanism thereof include a stirring shaft verticality-ascertaining structure(s) and mechanism thereof for determining current degree of verticality of the linearly-extending stirring shaft. Such measurement may be taken before, during or after agitation of media positioned within a vessel stably positioned relative to the linearly-extending stirring shaft, but must be correct during agitation.

In a fourth preferred embodiment as an improvement on the third preferred embodiment, the monitoring structure(s) and mechanism thereof include a media temperature structure and mechanism thereof for ascertaining shaft-stirred media's current temperature. Such measurement may be taken when the linearly-extending stirring shaft is agitating media positioned within a vessel stably positioned relative to the linearly-extending stirring shaft, but must be correct during agitation, but must be correct during agitation.

In a fifth preferred embodiment as an improvement on the fourth preferred embodiment, the monitoring structure(s) and mechanism thereof include a revolution per unit of time-stirring shaft-ascertaining structure(s) and mechanism thereof for determining current rate of revolutions per unit of time of the linearly-extending stirring shaft. Such measurement must be taken during agitation of media positioned within a vessel stably positioned relative to the linearly-extending stirring shaft.

In a sixth preferred embodiment as an improvement on the fifth preferred embodiment, there is additionally included printing structure(s) and mechanism thereof for printing onto a substrate at-least one of the physical attributes monitored by the monitoring structure(s) and mechanism thereof.

In a seventh preferred embodiment thereof, as an improvement on the sixth preferred embodiment, the visual display structure(s) and mechanism thereof include a printing structure(s) and mechanism thereof for printing onto a substrate a plurality of the physical attributes monitored by the monitoring structure(s) and mechanism thereof.

In an eighth preferred embodiment as an improvement on the seventh preferred embodiment, the visual display structure(s) and mechanism thereof include a video monitor visibly displayable of the physical attributes monitored by the monitoring structure(s) and mechanism thereof.

In a ninth preferred embodiment on the eighth preferred embodiment, the visual display structure(s) and mechanism thereof include a computer interface structure(s) and mechanism thereof for computer transmissions of the physical attributes monitored by the monitoring structure(s) and mechanism thereof to at-least one computer unit.

In a tenth preferred embodiment as an improvement on the ninth preferred embodiment, there is included a rotary drive structure(s) and mechanism thereof for mounting and revolvably driving the linearly-extending stirring shaft, and including the vessel and including a mounting structure(s) and mechanism thereof for stably commonly mounting each of the monitoring structure(s) and mechanism thereof and the vessel and a rotary driving mechanism for revolvably driving the linearly-extending stirring shaft during agitation of media positioned within the vessel. Thereby the linearly-extending stirring shaft, the vessel and the monitoring structure(s) and mechanism thereof retain fixed positions relative to one-another.

In an eleventh preferred embodiment, as an improvement on the broad invention, there is included the improvement of the second preferred embodiment.

In a twelfth preferred embodiment as an improvement on the broad invention above-described, there is included the improvement described in the third preferred embodiment above.

In a thirteenth preferred embodiment, as an improvement on the broad invention above-described, there is included the improvement described for the fourth preferred embodiment.

In a fourteenth preferred embodiment, as an improvement on the broad invention, there is included the improvement described for the fifth preferred embodiment.

In a fifteenth preferred embodiment, as an improvement on the broad invention, there is included the improvement described for the sixth preferred embodiment.

In a sixteenth preferred embodiment, as an improvement on the broad invention, there is included the improvement described for the seventh preferred embodiment.

In a seventeenth preferred embodiment as an improvement on the broad invention, there is included the improvement described for the eighth preferred embodiment.

In an eighteenth preferred embodiment, as an improvement on the broad invention, there is included the improvement described for the ninth preferred embodiment.

In a nineteenth preferred embodiment, as an improvement on the broad invention, there is included the improvement described for the tenth preferred embodiment.

The invention may be better understood by making reference to the following Figures.

BRIEF DESCRIPTION OF THE FIGURES

FIG. 2 diagrammatically illustrates in a side view thereof a temperature monitoring thermometer utilized in the combination of FIG. 1.

FIG. 5 diagrammatically illustrates in a front perspective view thereof, a preferred embodiment evidencing a composite unit having embodied in a single casing each of the digital selector, a monitor, an off-on switch, a printer and a paper-rollout substrate receivable of the printing and deliverable of the paper in a printed state, and inclusive of a carrying handle.

DETAILED DESCRIPTION OF THE FIGURES

Figure 1:
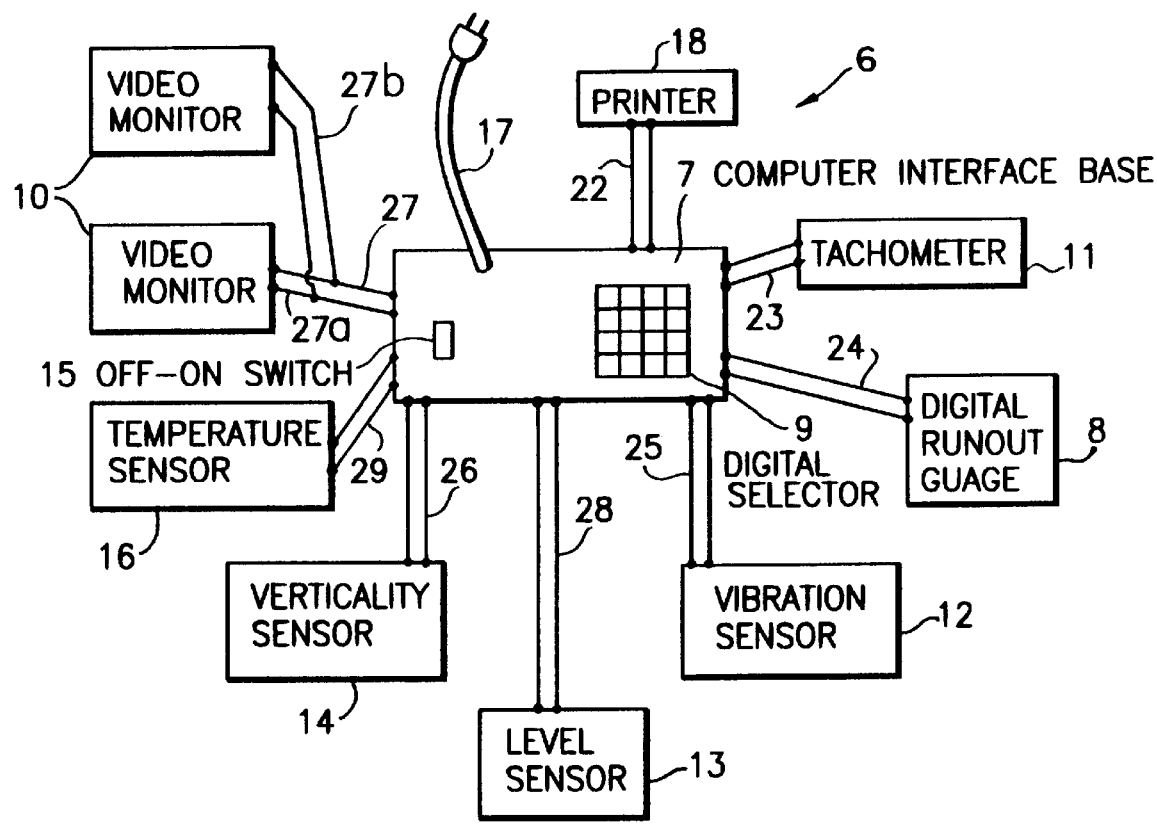
FIG. 1 diagrammatically illustrates in a block diagram, the combination of a more preferred embodiment of the invention.

In greater detail, FIG. 1 illustrates diagrammatically in a block diagram, a combination of the invention as a laboratory stirring shaft and solution monitoring comparator device 6. This particular preferred embodiment includes a typically conventional commercially available computer interface base unit which includes a conventional commercially available digital selector 9 such as contains electrostatic or other conventional surfaces which when touched or pushed, each selects one or more code digits and/or letters which alone or taken together selects the data to be displayed on a read-out meter—i.e. on a monitor which may be mechanical and/or electronic such as one or more conventional video display screen 10. The comparator device 6 has mounted thereon as a part of its power circuit, an off-on power selector switch or button 15. While for any one or more applications for the present invention, there may be different numbers and types of sensory devices conventionally operatively attached to the comparator device, the most preferred thereof for sensing the more relevant and important physical attributes of the working equipment and/or of the liquid and solute or the like therein being stirred, typically include a typically conventionally commercially available tachometer sensor 11 with typically conventional commercially available electronic readout circuits, a typically conventionally commercially available vibration sensor 12 with typically conventional commercially available readout circuits, a conventional commerially available level sensor 13 with conventional commerially available readout circuits, a typically conventional commercially available verticality sensor also commonly illustrated with the symbolic as 13 with typically conventional electronic readout circuits, and a typically conventional and commercially available temperature sensor 16 with typically conventional electronic readout circuits.

The digital runout gauge 8 is a commercially available conventional digital runout gauge 8 in the trade characteristically known as a wobble-detector, for detecting a bent and/or warped any/or otherwise damaged and/or defective revolvable stirring shaft when such shaft is drivably mounted to be driven by a conventional rotary drive driving motor appropriately conventionally mounted and supported. The wobble-detector typically has an outwardly axially directed spring-biased elongated member that rests against a lower-positioned portion of an upright outer surface of the revolvable stirring rod when the rod is in its downwardly-extending mounted states, to detect extent to which that outer surface move closer to and further away from the wobble-detector—moving toward the biased elongated member to press-backwardly the biased elongated member, and alternately to move away from the biased elongated member to allow the biased elongated member to be spring-biased further forwardly (or outwardly). The wobble-detector typically has conventional commercially available electrical connector(s) 24.

One or more typically conventional commercially available video monitors such as video monitors 10 located at different locations, display on thereon the data transmitted thereto from the computer interface base 7—which data may be a separate intermittent single reading from any one of the sensors above-identified feeding sensory information into the computer interface base 7, or alternately my be any two or more reading either alternately, and/or intermittently, and/or concurrently all continuously, and/or may display a charted change in one or more of the readings of one or more of the sensors above-described. The monitor(s) has/have typically conventional commercially available electrical connector(s) 27a and/or 27b and/or the main connector 27.

The tachometer sensor 11 is positioned relative to the position or intended position of a stirring shaft such that it detects and ascertains the rate of revolutions of the stirring shaft having stirring blade(s) mounted on the distal end of the stirring shaft. In a typical and preferred commercially available tachometer, the tachometer sensor senses the rate of occurance of a point repeatedly revolves past the detection sensor elements of the tachometer sensor, from time to time and/or as an ongoing continuous monitoring thereof. It has typically conventional and commercially available electrical connector(s) 23.

The vibration sensor 12 typically rests on typically the support surface of the vessel containing the liquid being agitated by the stirring blade(s) in liquid within the vessel, as to ascertain existing and/or increases or other changes in the current vibrations during the stirring, from time to time and/or as an ongoing continuous monitoring thereof. It has typically conventional and commercially available electrical connector(s) 25.

The level sensor 13 ascertains the extent to which the above-noted support surface of the vessel and/or the top surface of the vessel itself is horizontally level, from time to time and/or as an ongoing continuous monitoring thereof. It has typically conventional and commercially available electrical connector(s) 28.

The verticality sensor 14 ascertains the extent to which a good (straight/linear) mounted revolvable stirring shaft is initially and/or remains mounted in a vertically-oriented state and position, or alternately the fact of and/or extent to which it is not vertically oriented. It has typically conventional and commercially available electrical connector(s) 26.

The temperature sensor 16 when intermittently dipped into the liquid being stirred, or alternately when continuously mounted within the liquid being stirred, typically is of an electronic variety that registers ongoing temperature reading(s). It has typically conventional and commercially available electrical connector(s) 29.

The comparatory interface base and the respective sensors thereof above-described, include typically conventional power source(s) such as power-source power-cord 17.

FIG. 2 diagrammatically illustrates in a side view, a temperature monitoring thermometer 16' utilized in the combination of FIG. 1. The typically electronic thermometer has sensory portion 21, handle portion 20 and electrical connector(s) 29'.

Figure 3:
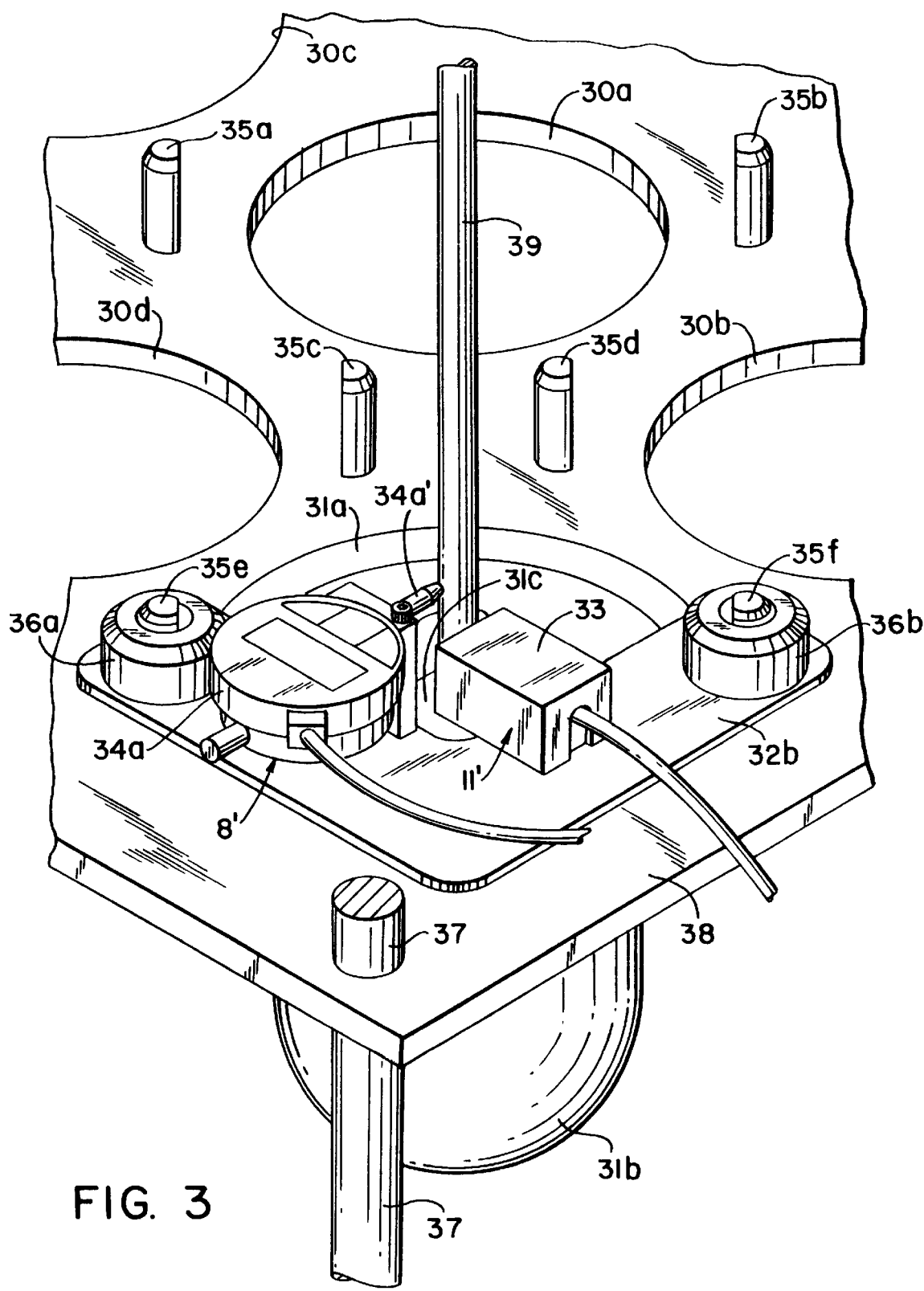
FIG. 3 diagrammatically illustrates in an in-part perspective side view thereof the wobble-detecting runout gauge utilized in the combination of claim 1.

FIG. 3 diagrammatically illustrates in an in-part view of a supporting platform 38 with mixing-vessel through-space circular hole (openings) such as openings 30a through 30d, having the wobble-detecting runout gauge 8' utilized in the combination of claim 1 mounted in proper orientation to the support platform and the downwardly linearly-extending shaft 39. Also illustrated in a typical correct positioning thereof relative to the support platform and the downwardly linearly-extending shaft 39, is the tachometer 11'. Each of the wobble-detector (8') and the tachometer 11' are mounted on detachably mounted separate support 32b mounted by the oriented through-space anchors 36a and 36b on the respective platform-mounted pegs 35f and 35e, with the spring-biased elongated member 34a' shown in the spring-biased state with its distal end pushed against linearly-extending stirring shaft 39. Other typical appropriately positioned pegs 35a, 35b, 35c and 35e, positioned for concurrently mounting duplicate other sensor detection devices (not shown) operatively for other liquid-conting vessels (not shown) that may be concurrently mounted in the other through-space holes 30a through 30d. Also shown is the liquid containing vessel 31b with its inner space 31c and with its supporting upper flange 31a by which it is supported on the support 38 within a through-space hole such as previously describe through-space mounting holes 30a athrough 30d.

Figure 4:
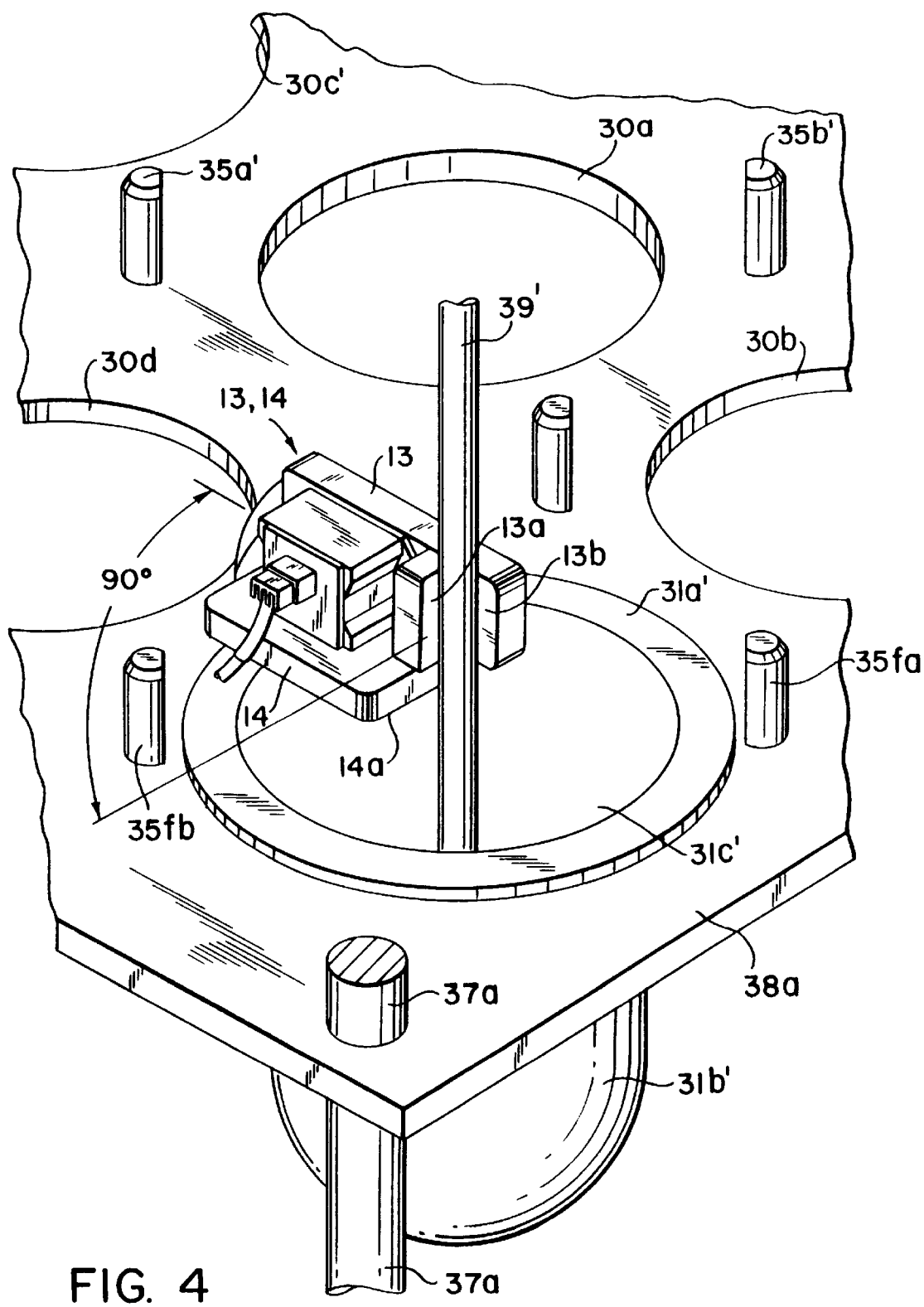
FIG. 4 diagrammatically in an in-part perspective side view thereof illustrates a device embodying both the level sensor and the verticality sensor utilized in the combination of FIG. 1.

FIG. 4 diagrammatically illustrates a setting the same as that of FIG. 3, however here illustrating typically located and position a combination device embodying both the conventional commercially available verticality sensor 14 and level sensor 13. The verticality sensor 14 has its flat bottom 14a resting on the supporting upper flange 31a. The level sensor 13 has separate upright surface structures 13a and 13b at right angles (90 degrees) to each other with both surfaces 13a and 13b in contact with the downwardly-extending continuous linear surface of the revolvable stirring shaft 39', as utilized and illustrated in the combination of FIG. 1.

FIG. 5 diagrammatically illustrates a preferred embodiment evidencing a composite unit 7a having embodied in a single casing each of the digital selector 9', a monitor 10a, an off-on switch 15a, a conventional printer 18' and a paper-rollout substrate 18a receivable of the printing and conventionally deliverable of the paper in a printed state, and inclusive of a carrying handle; optionally, others of the illustrated sensors illustrated for FIG. 1 may also be conventionally operatively connected, normally by conventional commercially available aelectrical jack-connectors or the like on the rearward face thereof. All elements herein illustrated have been previously described above, apart from the also lifting handle 19 and the print-out paper substrate.

It is within the scope of the present invention to make such variations, substitution of equivalents, and modifications thereto to the extent within the skill of an ordinary artisan in this field of technology.

What is claimed is:

1. A laboratory stirring shaft and solution monitoring comparator device comprising in combination: monitoring means adapted for use in association with a downwardly-directed revolvable linearly-extending stirring shaft having a distal end at least one of (a) carrying and (b) adapted to carry at least one stirring blade, said monitoring means being for measuring physical attributes of the downwardly directed revolving linearly-extending stirring shaft when the linearly-extending stirring shaft has the distal end stably mounted and positioned to be revolved within media such that the at least one stirring blade is enabled to agitate the media within a vessel stably positioned relative to the linearly-extending stirring shaft in which physical attributes include at-least one of (a) wobble during revolving thereof, (b) verticality, (c) rate of revolutions, and (d) current magnitude of wobble-induced vibrations; and a visual display means for visually displaying data measured by said monitoring means of said physical attributes.

2. A laboratory stirring shaft and solution monitoring comparator device comprising in combination: monitoring means adapted for use in association with a downwardly-directed revolvable linearly-extending stirring shaft having a distal end at least one of (a) carrying and (b) adapted to carry at least one stirring blade, said monitoring means being for measuring physical attributes of the downwardly directed revolving linearly-extending stirring shaft when the linearly-extending stirring shaft has the distal end stably mounted and positioned to be revolved within media such that the at least one stirring blade is enabled to agitate the media within a vessel stably positioned relative to the linearly-extending stirring shaft in which physical attributes include at-least one of (a) wobble during revolving thereof, (b) verticality, (c) rate of revolutions, and (d) current magnitude of wobble-induced vibrations; and a visual display means for visually displaying data measured by said monitoring means of said physical attributes, and in which said monitoring means includes a stirring shaft wobble-ascertaining means for determining current degree of wobble of the linearly-extending stirring shaft during agitation of media positioned within a vessel stably positioned relative to the linearly-extending stirring shaft.

3. A laboratory stirring shaft and solution monitoring comparator device of claim 2, in which said monitoring means includes a stirring shaft vibration-ascertaining means for determining current magnitude of wobble-induced vibrations of the linearly-extending stirring shaft during agitation of media positioned within a vessel stably positioned relative to the linearly-extending stirring shaft.

4. A laboratory stirring shaft and solution monitoring comparator device comprising in combination: monitoring means adapted for use in association with a downwardly-directed revolvable linearly-extending stirring shaft having a distal end at least one of (a) carrying and (b) adapted to carry at least one stirring blade, said monitoring means being for measuring physical attributes of the downwardly directed revolving linearly-extending stirring shaft when the linearly-extending stirring shaft has the distal end stably mounted and positioned to be revolved within media such that the at least one stirring blade is enabled to agitate the media within a vessel stably positioned relative to the linearly-extending stirring shaft in which physical attributes include at-least one of (a) wobble during revolving thereof, (b) verticality, (c) rate of revolutions, and (d) current magnitude of wobble-induced vibrations, said monitoring means including a stirring shaft verticality-ascertaining means for determining current degree of verticality of the linearly-extending stirring shaft during agitation of media positioned within a vessel stably positioned relative to the linearly-extending stirring shaft; and a visual display means for visually displaying data measured by said monitoring means of said physical attributes.

5. A laboratory stirring shaft and solution monitoring comparator device of claim 1, including a media temperature ascertaining means for determining current temperature of media when said linearly-extending stirring shaft is agitating media positioned within a vessel stably positioned relative to the linearly-extending stirring shaft.

6. A laboratory stirring shaft and solution monitoring comparator device of claim 2, in which said monitoring means includes a revolution per unit of time-stirring shaft-ascertaining means for determining current rate of revolutions per unit of time of the linearly-extending stirring shaft during agitation of media positioned within a vessel stably positioned relative to the linearly-extending stirring shaft.

7. A laboratory stirring shaft and solution monitoring comparator device of claim 3, including printing means for printing onto a substrate at-least one of said physical attributes monitored by said monitoring means.

8. A laboratory stirring shaft and solution monitoring comparator device of claim 4, in which said visual display means includes a printing means for printing onto a substrate a plurality of said physical attributes monitored by said monitoring means.

9. A laboratory stirring shaft and solution monitoring comparator device of claim 5, in which said visual display means includes a video monitor visibly displayable of said physical attributes monitored by said monitoring means.

10. A laboratory stirring shaft and solution monitoring comparator device of claim 6, in which said visual display means includes a computer interface means for computer transmissions of said physical attributes monitored by said monitoring means to at-least one computer unit.

11. A laboratory stirring shaft and solution monitoring comparator device of claim 10, including said downwardly-directed revolvable linearly-extending stirring shaft and a rotary drive means for mounting and revolvably driving said downwardly-directed revolvable linearly-extending stirring shaft during agitation of media positioned within said vessel, and including said vessel and a mounting means for stably commonly mounting each of (a) said monitoring means and (b) said vessel such that said downwardly-directed revolvable linearly-extending stirring shaft, said vessel and said monitoring means retain fixed positions relative to one-another.

12. A laboratory stirring shaft and solution monitoring comparator device of claim 2, including said downwardly-directed revolvable linearly-extending stirring shaft and a rotary drive means for mounting and revolvably driving said downwardly-directed revolvable linearly-extending stirring shaft, and including said vessel and including a mounting means for stably commonly mounting each of (a) said monitoring means and (b) said vessel and c) a rotary driving mechanism revolvably drivable of said linearly-extending stirring shaft during agitation of media positioned within said vessel such that said downwardly-directed revolvable linearly-extending stirring shaft, said vessel and said monitoring means retain fixed positions relative to one-another.

13. A laboratory stirring shaft and solution monitoring comparator device comprising in combination: monitoring means adapted for use in association with a downwardly-directed revolvable linearly-extending stirring shaft having a distal end at least one of (a) carrying and (b) adapted to carry at least one stirring blade, said monitoring means being for measuring physical attributes of the downwardly directed revolving linearly-extending stirring shaft when the linearly-extending stirring shaft has the distal end stably mounted and positioned to be revolved within media such that the at least one stirring blade is enabled to agitate the media within a vessel stably positioned relative to the linearly-extending stirring shaft in which physical attributes include at-least one of (a) wobble during revolving thereof, (b) verticality, (c) rate of revolutions, and (d) current magnitude of wobble-induced vibrations; and a visual display means for visually displaying data measured by said monitoring means of said physical attributes, said monitoring means includes a stirring shaft wobble-ascertaining means for determining current degree of wobble of the linearly-extending stirring shaft during agitation of media positioned within a vessel stably positioned relative to the linearly-extending stirring shaft, and said monitoring means including a stirring shaft verticality-ascertaining means for determining current degree of verticality of the linearly-extending stirring shaft during agitation of media positioned within a vessel stably positioned relative to the linearly-extending stirring shaft.

* * * * *